Patented Sept. 28, 1943

2,330,211

UNITED STATES PATENT OFFICE 2,330,211

FILTER TREATMENT

Clifford I. Haney, Drummondville, Quebec, Canada, assignor to Celanese Corporation of America, a corporation of Delaware No Drawing. Application March 23, 1940, Serial No. 325,657

6 Claims. (Cl. 210—62)

This invention relates to an improved filtration procedure and relates more particularly to a procedure for improving the filtration characteristics of solutions of organic derivatives of cellulose.

An object of this invention is to provide a filtration procedure which will increase the rate of flow of said solutions through filtration media.

Another object of this invention is to increase the total flow of said solutions through filtration media and therefore to obtain an increased output per filter press or other filtration unit employed.

Other objects of this invention will appear from the following detailed description.

In the filtration of any solution, the normal object of the filtration procedure is the removal of any extraneous or foreign materials from the solution which may interfere with the purity or the homogeneity of the solution. The degree of care which must be exercised in completely removing said extraneous or foreign materials is in direct relation to the purposes for which the solution is being filtered. Where the success of a subsequent step in a process depends entirely upon the homogeneity of the solution, such as a process whereby the solution is to be passed through minute holes, extreme care must be exercised.

While it is ordinarily possible to filter most solid materials from solutions, the problem becomes increasingly difficult where such extraneous materials are not in the form of solids but, rather, gel-like or colloidal in character. Under such circumstances ordinary filtration means do not give the results desired and fine holes at some subsequent stage in the process may become clogged or else pores in the filtering medium may be closed and the rate of filtration seriously retarded.

This problem is one which becomes increasingly acute where solutions, such as those of organic derivatives of cellulose are to be spun into filaments by passing these solutions through spinning jets containing holes of extremely small diameters. In such a case it is essential that the solutions be absolutely free of foreign or extraneous materials, those which are solid as well as those which are gel-like in character. Unless said materials are removed, the extremely fine holes in the spinning jet will quickly become clogged. The result will be frequent and costly shut-downs in the plant with a concomitant economic loss.

I have now discovered that not only may the above-mentioned stoppages be almost completely eliminated, but also that the speed at which the solutions are filtered can be noticeably increased by the addition of certain filtering aids to the solution in the course of their filtration.

These substances which may be added to the said solutions are materials which are preferably fibrous in character. Among those which are especially suitable are, for instance, ramie, jute, cotton, finely divided wood pulp cellulose such as finely divided "Kimpak," which normally is sold in the form of very thin sheets, and other materials of like character. These materials are preferably used in the form in which the fibers are well divided and separated. While all these materials are suitable I prefer to use cotton in the form of linters or else use said cotton linters mixed with any of the above mentioned materials.

These fibrous materials are added to the solution in the course of filtration. They may be added to the solution prior to the first filtration stage, or they may be added after the solution has already gone through one or more filtration stages. In other words, these fibrous materials may be added to the solution at any stage to improve the filtration characteristics of the solution at subsequent stages but they are preferably added to the solutions prior to the first stage of filtration.

The amount of fibrous material which may be added to the solution to obtain the desired and beneficial effects may vary. Under ordinary circumstances the amount of fibrous material added will be from about 0.01% to about 0.2% but the amount we preferably use is about 0.05% based upon the weight of the solution treated.

The fibrous materials may be in a coarse form or else they may be finely divided. Very satisfactory results may be obtained when the fibrous material is broken by hand and air blown but more finely divided material which has been broken apart and screened may be used.

When these fibrous materials are added to the solutions to be filtered, the rate of filtration is maintained at a desirably high level even after considerable amounts of solution are filtered through the same filter plate dressings. In some cases the rate at which the solution is filtered, when the solutions are treated in accordance with my invention, is increased to about 20% over the rate at which the untreated solution is filtered.

My invention is applicable to the treatment of solutions of organic substitution derivatives of cellulose in organic solvents. As examples of solutions of said derivatives there may be mentioned solutions of cellulose esters, for example, cellulose acetate, propionate or butyrate, mixed esters such as the acetate-butyrate and acetate-propionate, or cellulose ethers such as ethyl and benzyl cellulose and the analogous condensation products obtainable from cellulose and glycols or other polyhydric alcohols in organic solvents. These solutions may contain small amounts of water or else may be used in anhydrous form.

In order to further illustrate my invention but without being limited thereto the following examples are given:

Example I

A spinning dope containing 25 parts by weight of cellulose acetate and 75 parts of a solution containing 95 parts by weight of acetone and 5 parts by weight of water is mixed with 0.05% of its own weight of cotton linters which are broken apart by hand and air blown. The solution is filtered at 35° C. and 25 pounds per square inch pressure through a filter press whose plates are each dressed with two superimposed sheets of madapolam filtering cloth. The filtered solution is then passed at 35° C. and 100 pounds per square inch pressure to a second filter press whose plates are dressed with a dressing consisting of a layer of madapolam cloth, a layer of cotton batting, twenty-four composited sheets of "Kimpak" (a wood pulp cellulose sheet rolled out thinly) and another layer of madapolam. After a run of 31 hours it was found that the rate at which the dope passed through the filter was 31.0% of the initial rate of flow of the dope through the filter at the beginning of the filtration process. When untreated dope is subjected to the same filtration steps, it is found that the rate of filtration of the dope at the end of the filtration process is only 16.9% of the initial rate of flow of the dope.

Example II

A spinning dope containing 25 parts of cellulose acetate and 75 parts of 95/5 acetone/water is subjected to the primary filtration stage by passage through a filter press in which the plates are each dressed with two madapolam sheets. The filtered dope is charged into a dope mixer, corrected to the desired viscosity and water content, and mixed with 0.05% of its own weight of cotton linters. The dope is then filtered at 35° C. and 100 pounds per square inch pressure in a filter press in which the plates are dressed as in Example I with madapolam, cotton batting and "Kimpak." After a 32 hour run the rate at which the dope is passing through the filter is 31.2% of the rate at which it flowed through the filter at the beginning of the filtration period. When untreated dope undergoes the same filtration the rate of flow of the dope at the end of a similar period is only 25.6% of the rate of flow prevailing at the start of the filtration.

It is to be understood that the foregoing detailed description is given merely by way of illustration and that many variations may be made therein without departing from the spirit of my invention.

Having described my invention, what I desire to secure by Letters Patent is:

1. Process for improving the filtering properties of viscous solutions of organic derivatives of cellulose, which comprises adding a fibrous material to a viscous solution of an organic derivative of cellulose in an organic solvent, the amount of fibrous material added to the solution being not less than 0.01% nor more than 0.2%, based on the weight of the solution, and then filtering said solution.

2. Process for improving the filtering properties of viscous solutions of cellulose acetate, which comprises adding a fibrous material to a viscous solution of cellulose acetate in an organic solvent, the amount of fibrous material added to the solution being not less than 0.01% nor more than 0.2%, based on the weight of the solution, and then filtering said solution.

3. Process for improving the filtering properties of viscous solutions of cellulose acetate, which comprises adding to a solution of cellulose acetate in a solvent medium consisting of acetone and water, not less than 0.01% nor more than 0.2%, based on the weight of the solution, of cellulosic fibers and then filtering the solution.

4. Process for improving the filtering properties of viscous solutions of cellulose acetate, which comprises adding to a solution of cellulose acetate in a solvent medium consisting of acetone and water, not less than 0.01% nor more than 0.2%, based on the weight of the solution, of cotton fibers and then filtering the solution.

5. Process for improving the filtering properties of viscous solutions of cellulose acetate, which comprises adding to a solution of cellulose acetate in a solvent medium consisting of acetone and water, 0.05%, based on the weight of the solution, of cellulosic fibers and then filtering the solution.

6. Process for improving the filtering properties of viscous solutions of cellulose acetate, which comprises adding to a solution of cellulose acetate in a solvent medium consisting of acetone and water, 0.05%, based on the weight of the solution, of cotton fibers and then filtering the solution.

CLIFFORD I. HANEY.